Patented Dec. 15, 1953

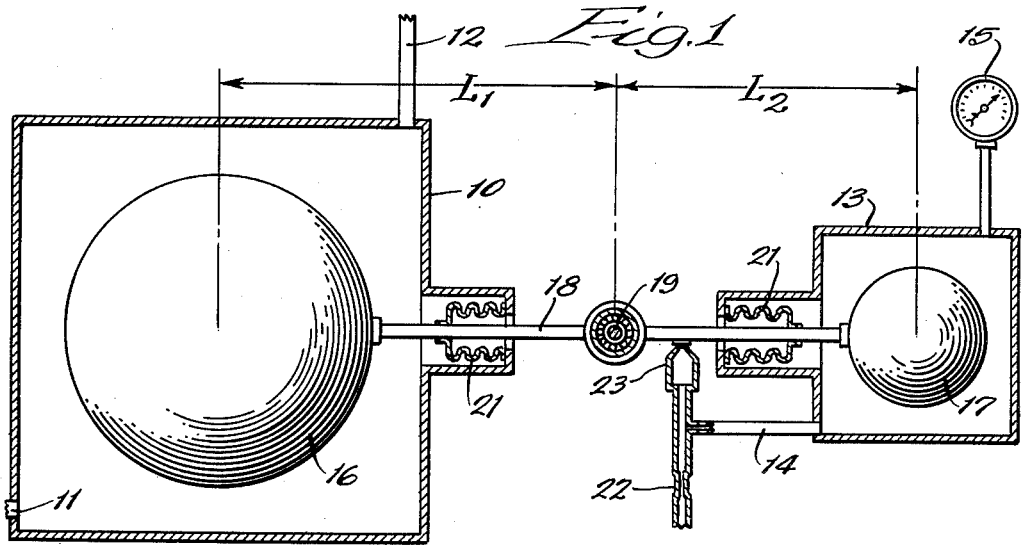
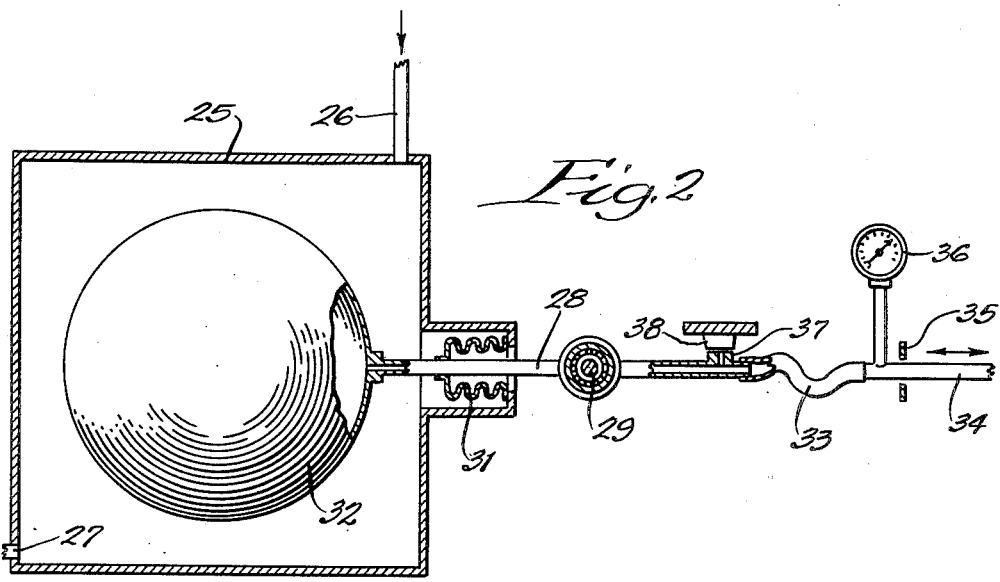

2,662,394

UNITED STATES PATENT OFFICE 2,662,394

APPARATUS FOR MEASURING THE DENSITY OF GASES

Jerome B. McMahon, Wilmette, Ill., assignor to Republic Flow Meters Company, Chicago, Ill., a corporation of Illinois Application January 21, 1948, Serial No. 3,485

5 Claims. (Cl. 73—30)

This invention relates to apparatus for measuring the density of a gas and more particularly to apparatus for continuously measuring changes in gas density due to either changes in its composition or in its pressure.

For many purposes in industrial processes and the like it is desirable to have a continuous indication of the density of a gas regardless of whether the changes in density are due to changes in composition or to changes in pressure. It is one of the objects of the present invention to provide an apparatus which will continuously and accurately measure changes in density of a gas.

Another object is to provide apparatus for measuring the density of a gas in which a displacer suspended in the gas to be measured is balanced against a standard gas and the pressure of the standard gas is controlled in response to the condition of balance. In one construction two displacers may be balanced against each other and in another a single displacer may be suspended in one gas and filled with the other. In this construction the pressure of the standard gas becomes an accurate measure of the density of the gas sample.

The above and other objects and advantages of the invention will be more readily apparent when read in connection with the accompanying drawing, in which—

Figures 1 and 2 are diagrammatic views of two alternative forms of apparatus embodying the invention.

As shown in Figure 1, the gas to be measured, which may be any desired type of processed gas or the like, is circulated through a closed chamber 10 by means of inlet conduit 11 and outlet conduit 12. The gas sample is preferably circulated continuously at a relatively low velocity so that velocity effects become negligible in the apparatus and may be disregarded.

A second chamber 13 is mounted adjacent the chamber 10 and has an inlet conduit 14 for a standard gas such as air connected thereto. A device for indicating, recording or controlling may also be connected to the chamber 13 as represented by the pressure gauge 15.

Each of the chambers is adapted to contain a displacer which may be in the form of hollow spherical balls, although any desired type or shape of displacers could be used equally well. As shown, the chamber 10 contains a relatively large spherical displacer 16 and a similar but somewhat smaller displacer 17 is mounted in the chamber 13. The displacers are connected by balancing means shown as a beam 18 connected at its opposite ends to the displacers and pivotally supported on a central bearing 19. The beam may extend through openings in the chambers which are flexibly sealed by bellows 21.

According to the present invention the density of the sample gas is continuously indicated by controlling the pressure in the chamber 13 in response to the condition of balance of the displacers. For this purpose the air supply conduit 14 is connected through a restriction 22 to a source of air under pressure and is also connected to a discharge nozzle 23 located adjacent to the beam 18. The nozzle and beam form a control couple operating to control the pressure in the chamber 13 as the beam 18 moves. In normal operation the total movement of the beam 18 at a point adjacent the nozzle is on the order of a very few thousandths of an inch so that the apparatus functions substantially according to a force balance principle.

In operation the sample gas is circulated through the chamber 10 and as its density changes the effective weight of the displacer 16 will change to change the balanced condition of the beam. If the sample gas density increases, for example, the displacer will tend to rise to rock the beam clockwise thereby increasing the restriction of the nozzle 23. This will increase the pressure supplied to the chamber 13 to increase the density of the air or other standard gas therein until the displacer 17 changes its effective weight sufficiently to rebalance the beam. The change of pressure in the chamber 13 can be indicated by a gauge such as 15 calibrated in terms of sample gas density or can, if desired, be utilized to operate a recording or control mechanism. It will be apparent that the pressure in the chamber 13 is continuously proportional to the density of the sample gas so that a continuous measurement is obtained at all times.

Figure 2 illustrates an alternative construction functioning according to the same general principles. This construction comprises a hollow chamber 25 through which a sample of the gas to be measured is circulated by means of conduits 26 and 27. A hollow pivoted balance beam 28 pivoted at 29 extends into the chamber through a flexible seal 31 and carries a hollow displacer 32 within the chamber. The beam communicates with the interior of the displacer as shown and is connected through a flexible hose 33 to a source of a standard gas indicated at 34. A restriction 35 is placed in the conduit 34 and the conduit may be connected to an indicating, recording or control device shown generally as a pressure gauge 36.

The pressure of the standard gas in the displacer is controlled by an orifice 37 connected to the hollow beam and movable toward and away from a fixed anvil 38.

In operation the sample of gas to be measured is circulated through the chamber and the pressure of the standard sample, such as air, in the displacer is controlled so that the beam will balance. Upon a change in density of the sample, the beam will rock toward or away from the anvil to increase or decrease the pressure of the standard sample until the beam is rebalanced, and in this way the pressure of the standard sample becomes an accurate measure of the density of the gas to be measured.

In both constructions it will be apparent that the pressure of the standard sample could be maintained either above or below atmospheric depending upon the range of density of the gas to be measured. In both instances the construction has been shown such that it will maintain the standard gas at a super-atmospheric pressure. It will be apparent, however, that by connecting the nozzle to a source of vacuum and reversing the relationship between the nozzle and balance beam a sub-atmospheric pressure could be maintained. This construction would be useful, for example, in measuring the density of gas samples which are less dense than air.

While two embodiments of the invention have been shown and described in detail herein, it will be understood that these are illustrative only and are not to be taken as a definition of the scope of the invention, reference being had for this purpose to the appended claims.

What is claimed is:

1. Apparatus for measuring the density of a gas which comprises a first chamber to receive the gas to be measured, a second chamber to receive a standard gas, displacers of constant volume in the chambers in buoyant relationship with the gas therein, balance means connecting the displacers, and control means responsive to movement of the balance means to control the pressure of the standard gas in the second chamber thereby to vary the density of the gas in the second chamber an indicating means responsive to the pressure of the standard gas to indicate the density of the gas to be measured.

2. Apparatus for measuring the density of a gas which comprises a first chamber to receive the gas to be measured, a second chamber to receive a standard gas, displacers of constant volume in the chambers in buoyant relationship with the gas therein, balance means connecting the displacers, a supply connection to supply standard gas under pressure to the second chamber, and control means in the connection responsive to movement of the balance means to control the pressure of the standard gas thereby to vary the density of the gas in the second chamber an indicating means responsive to the pressure of the standard gas to indicate the density of the gas to be measured.

3. Apparatus for measuring the density of a gas which comprises a first chamber to receive the gas to be measured, a second chamber to receive a standard gas, displacers of constant volume in the chambers in buoyant relationship with the gas therein, balance means connecting the displacers, a supply connection to supply standard gas under pressure to the second chamber, and a nozzle in the supply connection adjacent the balance means to be variably restricted by the approach and recession of the balance means thereby to control the pressure of the standard gas in the second chamber thereby to vary the density of the gas in the second chamber an indicating means responsive to the pressure of the standard gas to indicate the density of the gas to be measured.

4. Apparatus for measuring the density of a gas sample comprising a first chamber, connections to the first chamber to produce a constant circulation therethrough of a gas to be measured, a second chamber, displacers of constant volume in the chambers in buoyant relationship with the gas therein, balance means connecting the displacers, a connection to the second chamber to supply a standard gas thereto under pressure, and control means continuously responsive to the condition of the balance means to control the pressure of the standard gas in the second chamber thereby to vary the density of the gas in the second chamber an indicating means responsive to the pressure of the standard gas to indicate the density of the gas to be measured.

5. Apparatus for measuring the density of a gas sample comprising a first chamber, connections to the first chamber to produce a constant circulation therethrough of a gas to be measured, a second chamber, displacers of constant volume in the chamber in buoyant relationship with the gas therein, balance means connecting the displacers, a connection to the second chamber to supply a standard gas thereto under pressure, and a nozzle in the last named connection lying adjacent the balance means to be variably restricted by the approach and recession of the balance means thereby to control the pressure of the standard gas in the second chamber thereby to vary the density of the gas in the second chamber an indicating means responsive to the pressure of the standard gas to indicate the density of the gas to be measured.

JEROME B. McMAHON.

References Cited in the file of this patent

UNITED STATES PATENTS

| Number | Name | Date |
| --- | --- | --- |
| 2,459,542 | Rosenberger | Jan. 18, 1949 |